US012011838B2

(12) United States Patent
Hasegawa et al.

(10) Patent No.: US 12,011,838 B2
(45) Date of Patent: Jun. 18, 2024

(54) ROBOT SYSTEM

(71) Applicant: KAWASAKI JUKOGYO KABUSHIKI KAISHA, Kobe (JP)

(72) Inventors: Shogo Hasegawa, Kobe (JP); Tetsuya Yoshida, Kobe (JP); Masayuki Kamon, Kobe (JP); Hirokazu Sugiyama, Kobe (JP); Tomofumi Okamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 234 days.

(21) Appl. No.: 17/438,583

(22) PCT Filed: Mar. 13, 2020

(86) PCT No.: PCT/JP2020/011032
§ 371 (c)(1),
(2) Date: Sep. 13, 2021

(87) PCT Pub. No.: WO2020/195928
PCT Pub. Date: Oct. 1, 2020

(65) Prior Publication Data
US 2022/0184814 A1 Jun. 16, 2022

(30) Foreign Application Priority Data

Mar. 22, 2019 (JP) ................................. 2019-055256
May 28, 2019 (JP) ................................. 2019-099562

(51) Int. Cl.
*B25J 9/16* (2006.01)
(52) U.S. Cl.
CPC ................... *B25J 9/1694* (2013.01)

(58) Field of Classification Search
CPC ...... B25J 9/1694; B25J 9/1697; B25J 9/1689; B25J 11/0065; B25J 11/0075; B25J 13/025; B25J 11/0055; G05B 2219/36455; G05B 2219/37134; G05B 2219/39439; G05B 2219/39448; G05B 2219/40134;
(Continued)

(56) References Cited

U.S. PATENT DOCUMENTS 4,298,300 A 11/1981 Francois et al.
8,972,052 B2 * 3/2015 Chiappetta ........... G05D 1/0016
700/245
(Continued)

FOREIGN PATENT DOCUMENTS

CN 102939188 A 2/2013
CN 107756408 A 3/2018
(Continued)

*Primary Examiner* — Harry Y Oh
(74) *Attorney, Agent, or Firm* — METROLEX IP LAW GROUP, PLLC

(57) ABSTRACT

A robot system according to the present disclosure includes a robot installed in a work area, a manipulator configured to be gripped by an operator and manipulate the robot, a sensor disposed at a manipulation area and configured to wirelessly detect positional information and posture information on the manipulator, and a control device which calculates a locus of the manipulator based on the positional information and the posture information on the manipulator detected by the sensor, and operates the robot on real time.

8 Claims, 6 Drawing Sheets

(58) Field of Classification Search
CPC .......... G05B 2219/40161; G05B 2219/40169; G05B 19/427; G09B 19/0069; G09B 19/24
See application file for complete search history.

(56) References Cited

U.S. PATENT DOCUMENTS

| | | |
|---|---|---|
| 2009/0299524 A1 | 12/2009 | Evans et al. |
| 2011/0017030 A1* | 1/2011 | Chambers ............ B25J 11/0025 83/13 |
| 2012/0166024 A1* | 6/2012 | Phillips ................ G05D 1/0088 701/2 |
| 2016/0279802 A1* | 9/2016 | Kietzman ............ G05B 19/421 |
| 2018/0243897 A1 | 8/2018 | Hashimoto et al. |
| 2018/0243899 A1 | 8/2018 | Hashimoto et al. |
| 2018/0243901 A1 | 8/2018 | Hashimoto et al. |
| 2018/0243902 A1 | 8/2018 | Hashimoto et al. |
| 2018/0243908 A1 | 8/2018 | Tojo et al. |
| 2018/0243910 A1 | 8/2018 | Hashimoto et al. |
| 2018/0243915 A1 | 8/2018 | Hashimoto et al. |
| 2018/0243916 A1 | 8/2018 | Hashimoto et al. |
| 2018/0243918 A1 | 8/2018 | Noguchi et al. |
| 2018/0243919 A1 | 8/2018 | Hashimoto et al. |
| 2018/0243920 A1 | 8/2018 | Hashimoto et al. |
| 2018/0243921 A1 | 8/2018 | Hashimoto et al. |
| 2018/0243922 A1 | 8/2018 | Hashimoto et al. |
| 2018/0243923 A1 | 8/2018 | Hashimoto et al. |
| 2018/0338806 A1* | 11/2018 | Grubbs .................. A61B 34/30 |
| 2018/0354130 A1 | 12/2018 | Preisinger et al. |
| 2020/0198120 A1 | 6/2020 | Hashimoto et al. |

FOREIGN PATENT DOCUMENTS

| | | |
|---|---|---|
| JP | S55-48592 A | 4/1980 |
| JP | H1-153288 A | 6/1989 |
| JP | H9-216183 A | 8/1997 |
| JP | H11-239583 A | 9/1999 |
| JP | 2006-315157 A | 11/2006 |
| JP | 2008-531320 A | 8/2008 |
| JP | 2011-110620 A | 6/2011 |
| JP | 2018-001381 A | 1/2018 |
| JP | 2018-192601 A | 12/2018 |
| JP | 3220165 U | 2/2019 |
| WO | 2009/096408 A1 | 8/2009 |
| WO | 2017/033351 A1 | 3/2017 |
| WO | 2017/033356 A1 | 3/2017 |
| WO | 2017/033362 A1 | 3/2017 |
| WO | 2017/049381 A1 | 3/2017 |
| WO | 2018/076094 A1 | 5/2018 |

* cited by examiner

ROBOT SYSTEM

CROSS REFERENCE TO RELATED APPLICATIONS

This application is a national stage entry of International Application No. PCT/JP2020/011032, filed on Mar. 13, 2020, which claims priority based on the Article 8 of Patent Cooperation Treaty from prior Japanese Patent Applications No. 2019-055256 filed on Mar. 22, 2019 and No. 2019-099562 filed on May 28, 2019, the entire contents of all of which are incorporated herein by reference.

TECHNICAL FIELD

The present disclosure relates to a robot system.

BACKGROUND ART

A method of generating motion-control data of a robot, which detects operation of a hand-held spray gun for teaching and teaches the operation to a painting robot, is known (for example, see Patent Document 1). According to the motion-control data generating method of the robot disclosed in Patent Document 1, the motion-control data is generated so that a moving path of the spray gun of the robot is moved along a straight line or a curved line in a spray section.

REFERENCE DOCUMENT OF CONVENTIONAL ART

Patent Document

[Patent Document 1] JP2018-001381A

DESCRIPTION OF THE DISCLOSURE

Problem to be Solved by the Invention

However, according to the motion-control data generating method of the robot disclosed in Patent Document 1 described above, after creating a program for teaching the operation of the robot, the robot is operated in accordance with the program. Therefore, when the robot is not able to paint correctly, it is necessary to create the program again, or correct the created program, thereby taking time for the teaching work.

Thus, there is still room for an improvement in the motion-control data generating method of the robot disclosed in Patent Document 1 described above in terms of an improvement of the work efficiency.

The present disclosure is to solve the above conventional problem, and one purpose thereof is to provide a robot system which can ease operator's burden and can improve the work efficiency.

SUMMARY OF THE DISCLOSURE

In order to solve the conventional problem described above, a robot system according to the present disclosure includes a robot installed in a work area and configured to spray or inject liquid to a workpiece and/or cut or polish the workpiece, a manipulator configured to be gripped by an operator and manipulate the robot, a sensor disposed at a manipulation area and configured to wirelessly detect positional information and posture information on the manipulator, and a control device. The control device calculates a locus of the manipulator based on the positional information and the posture information on the manipulator detected by the sensor, and operates the robot on real time.

According to this, since the operator can make the robot operate (manipulate) on real time, he/she can determine whether the work operation to the workpiece by the robot is performed correctly in an instant. Therefore, as compared with the motion-control data generating method of the robot disclosed in Patent Document 1 described above, it can shorten the time required for the teaching work. As a result, it can ease the operator's burden and improve the work efficiency.

Effect of the Disclosure

According to the robot system of the present disclosure, the operator's burden can be eased and the work efficiency can be improved.

MODES FOR CARRYING OUT THE DISCLOSURE

Figure 1:
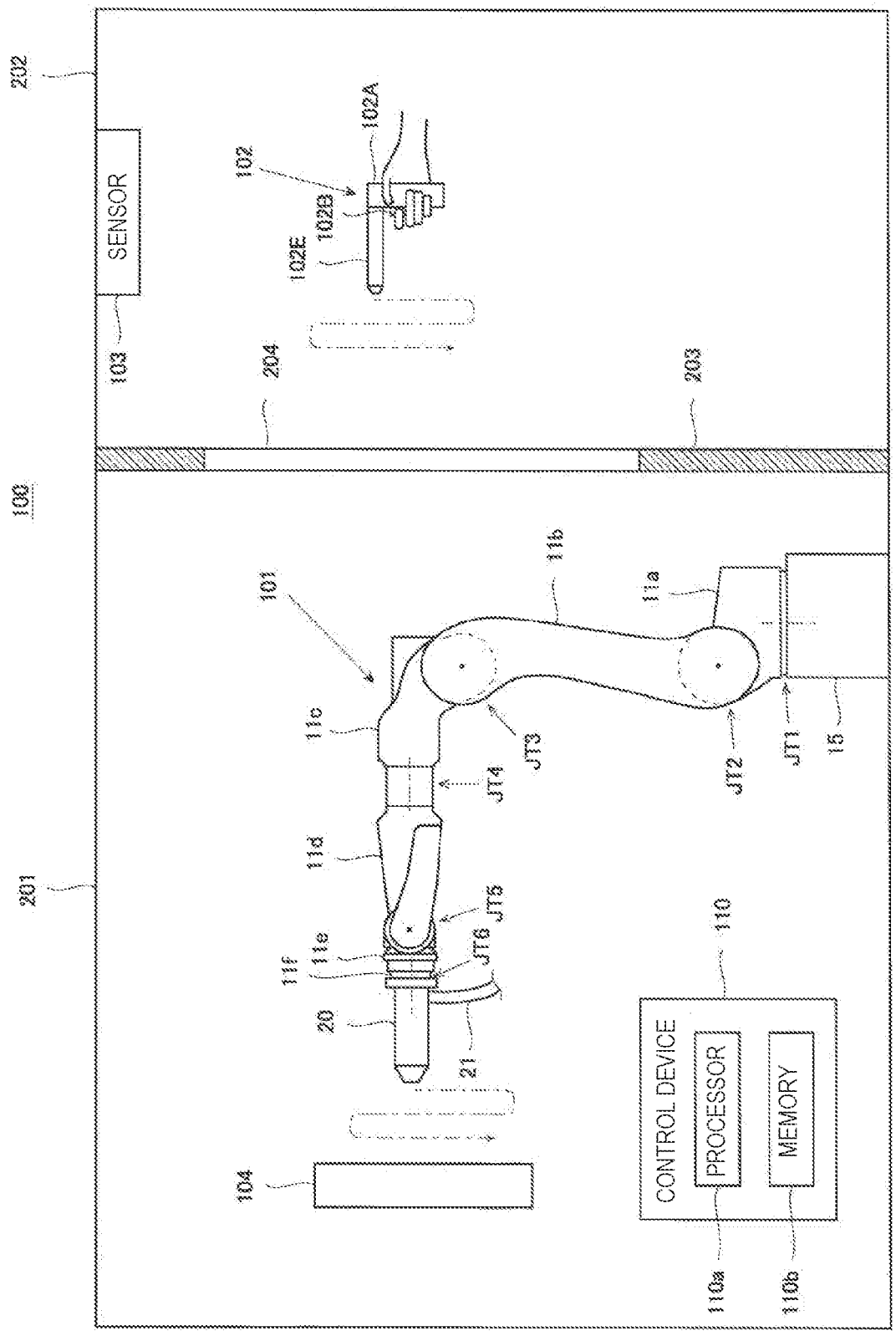
FIG. 1 is a schematic view illustrating an outline configuration of a robot system according to Embodiment 1.

Hereinafter, embodiments of the present disclosure will be described with reference to the drawings. Note that, throughout the drawings, the same reference characters are assigned to the same or corresponding parts to omit redundant description. Moreover, throughout the drawings, components for explaining the present disclosure are selectively illustrated, and illustration of other components may be omitted. Moreover, the present disclosure is not limited to the following embodiments.

Embodiment 1

A robot system according to Embodiment 1 includes a robot which is installed in a work area, and sprays or injects liquid to a workpiece, a manipulator configured so that an operator grips and manipulate the robot, and a sensor which is disposed at a manipulation area and wirelessly detects positional information and posture information on the manipulator, and a control device. The control device calculates a locus of the manipulator based on the positional information and the posture information on the manipulator detected by the sensor, and operates the robot on real time.

Moreover, in the robot system according to Embodiment 1, the control device may calculate the locus of the manipulator based on the positional information and the posture information on the manipulator detected by the sensor, and based on the calculated locus, it may cause the robot to perform any one of works on real time, such as an injecting work in which liquid or gas is injected to the workpiece, a cutting work in which the workpiece is cut, and a polishing work in which the workpiece is polished.

Moreover, in the robot system according to Embodiment 1, a gripping part of the manipulator may be provided with a first instrument configured to give a tactile sense to the operator, and the control device may have a memory which stores first information which is locus information on the manipulator by manipulation of an expert of one of works, such as the injecting work in which liquid or gas is injected to the workpiece, the cutting work in which the workpiece is cut, and the polishing work in which the workpiece is polished, and the control device may operate the first instrument so that the operator is guided based on the first information stored in the memory.

Moreover, in the robot system according to Embodiment 1, the control device may control the first instrument to give a tactile sense which becomes a warning to the operator, when there is a possibility of the robot moving outside an operating range set in advance, the robot approaching outside the operating range, or even when the robot is located inside the operating range, the robot moving into an area where moving is prohibited.

Hereinafter, one example of the robot system according to Embodiment 1 is described with reference to FIG. 1.

Configuration of Robot System

FIG. 1 is a schematic view illustrating an outline configuration of the robot system according to Embodiment 1.

As illustrated in FIG. 1, the robot system 100 according to Embodiment 1 includes a robot 101 installed inside a work area 201. The robot system 100 also includes a manipulator 102 and a sensor 103 which are disposed at a manipulation area 202, and a control device 110. The control device 110 operates the robot 101 on real time based on positional information and posture information in a three-dimensional space of the manipulator 102 detected by the sensor 103. Note that the robot 101 sprays or injects liquid to a workpiece 104, or cuts or polishes the workpiece 104.

A wall member 203 is disposed between the work area 201 and the manipulation area 202. In the wall member 203, a window 204 is provided so that the robot 101 disposed at the work area 201 is visible. Note that, in Embodiment 1, although the wall member 203 is disposed between the work area 201 and the manipulation area 202, it is not limited to this configuration but the wall member 203 may not be disposed.

For example, the sensor 103 wirelessly detects the positional information and the posture information on a tip-end part of the manipulator 102, and outputs the information to the control device 110. Note that the sensor 103 may output it to the control device 110 wirelessly or wiredly.

The sensor 103 may be comprised of an infrared sensor or may be comprised of a camera, for example. Note that, if the sensor 103 is comprised of the camera, the camera may not be disposed at the manipulation area 202. For example, the camera may be a camera installed in a personal digital assistant or a head mounted display which are carried by the operator.

The manipulator 102 is configured so that the operator grips a gripping part 102A and operates the robot 101. In detail, since the robot 101 operates so as to follow a locus of a tip-end part of a body part 102E of the gripped manipulator 102, the operator can intuitively manipulate the robot 101 by using the manipulator 102 inside the manipulation area 202.

In the gripping part 102A, an instrument which transmits to the operator inner-force sense information detected by an inner force sensor provided to an end effector 20 (described later) of the robot 101 or audio information may be disposed. The instrument includes a vibration motor, a speaker, and a mechanism which makes a casing which constitutes the gripping part 102A expand and contract, for example.

Moreover, the manipulator 102 may be provided with a switch 102B which starts/stops spraying of liquid or injecting of gas to the workpiece 104, or cutting or polishing of the workpiece 104. Note that the manipulator 102 may be configured to be portable by the operator. Moreover, the body part 102E of the manipulator 102 may be formed in the same shape as the end effector 20 of the robot 101.

The robot 101 is a vertical articulated robotic arm provided with a serially-coupled body comprised of a plurality of links (here, first to sixth links 11a-11f), a plurality of joints (here, first to sixth joints JT1-JT6), and a pedestal 15 which supports the links and joints. Note that, in Embodiment 1, although the vertical articulated robot is adopted as the robot 101, it is not limited to this configuration but may adopt a horizontal articulated robot.

In the first joint JT1, the pedestal 15 and a base-end part of the first link 11a are coupled to each other so as to be pivotable on an axis extending in the vertical direction. In the second joint JT2, a tip-end part of the first link 11a and a base-end part of the second link 11b are coupled to each other so as to be pivotable on an axis extending in the horizontal direction. In the third joint JT3, a tip-end part of the second link 11b and a base-end part of the third link 11c are coupled to each other so as to be pivotable on an axis extending in the horizontal direction.

Moreover, in the fourth joint JT4, a tip-end part of the third link 11c and a base-end part of the fourth link 11d are coupled to each other so as to be pivotable on an axis extending in the longitudinal direction of the fourth link 11d. In the fifth joint JT5, a tip-end part of the fourth link 11d and a base-end part of the fifth link 11e are coupled to each other so as to be pivotable on an axis perpendicular to the longitudinal direction of the fourth link 11d. In the sixth joint JT6, a tip-end part of the fifth link 11e and a base-end part of the sixth link 11f are coupled to each other so as to be pivotable in a twisting manner.

Further, a mechanical interface is provided to a tip-end part of the sixth link 11f. The end effector 20 corresponding to the content of work is detachably attached to the mechanical interface.

Here, the end effector 20 is configured to spray or inject liquid (for example, paint) to the workpiece 104. Moreover, piping 21 for supplying the liquid to the end effector 20 is connected to the end effector 20.

Moreover, the first to sixth joints JT1-JT6 are each provided with a drive motor (not illustrated) as one example of an actuator which relatively rotates two members coupled through the joint. The drive motor may be a servomotor which is servo-controlled by the control device 110, for example. Moreover, the first to sixth joints JT1-JT6 are each provided with a rotation sensor which detects a rotational position of the drive motor, and a current sensor which detects current for controlling the rotation of the drive motor (none of them is illustrated). The rotation sensor may be an encoder, for example.

The control device 110 includes a processor 110a such as a microprocessor or a CPU, and a memory 110b such as a ROM and/or a RAM. The memory 110b stores information, such as a basic program and various fixed data. The processor 110a controls various operations of the robot 101 by reading and executing software, such as the basic program stored in the memory 110b.

Moreover, based on the positional information and the posture information on the manipulator 102 inputted from the sensor 103, the control device 110 operates the robot 101 (end effector 20) so as to follow the motion of the tip-end part of the manipulator 102.

That is, based on the positional information and the posture information on the manipulator 102 detected by the sensor 103, the control device 110 calculates the locus of the manipulator 102 and operates the robot 101 on real time.

In detail, based on the positional information and the posture information on the manipulator 102 detected by the sensor 103, the control device 110 calculates the locus of the manipulator 102, and based on the calculated locus, it causes the robot 101 to perform one of works on real time among the injecting work in which the liquid or gas is injected to the workpiece 104, the cutting work in which the workpiece 104 is cut, and the polishing work in which the workpiece 104 is polished.

Here, the "work" such as the injecting work, the cutting work, and the polishing work is a series of operations which is performed by the robot 101 to the workpiece 104, and is a concept including a plurality of operations. For example, the work includes an operation in which the robot 101 approaches the workpiece 104, an operation in which it starts the injection of the liquid to the workpiece 104, an operation in which it stops the injection of the liquid, and an operation in which it separates from the workpiece 104.

Note that the control device 110 may be comprised of a sole control device 110 which carries out a centralized control, or may be comprised of a plurality of control devices 110 which collaboratively carry out a distributed control. Moreover, the control device 110 may be comprised of a microcomputer, or may be comprised of an MPU, a PLC (Programmable Logic Controller), or a logic circuit.

In the robot system 100 according to Embodiment 1 configured in this way, the control device 110 calculates the locus of the manipulator 102 based on the positional information and the posture information on the manipulator 102 detected by the sensor 103, and operates the robot 101 on real time.

Therefore, since the operator can make the robot 101 operate on real time, he/she can operate the robot 101 intuitively. Moreover, he/she can determine whether the work operation to the workpiece 104 by the robot 101 is performed correctly in an instant. Therefore, as compared with the motion-control data generating method of the robot disclosed in Patent Document 1 described above, it can shorten the time required for the teaching work. Therefore, it can ease the operator's burden and improve the work efficiency.

Note that the control device 110 may control a first instrument which is an instrument (actuator) for giving the tactile sense (such as a vibration motor provided to the gripping part 102A) and for performing haptic technology, so as to give the operator the tactile sense, such as vibration.

In this case, the control device 110 may calculate the locus of the manipulator 102 which is, for example, caused by an expert of the work, such as the injecting work, the cutting work, or the polishing work, moving (operating) the manipulator 102, and based on the calculated locus, it may store the work performed by the robot 101 (first information which is the locus information on the manipulator 102) in the memory 110b.

Moreover, the control device 110 may operate the robot 101 according to the locus information on the manipulator 102 by the manipulation of the expert, which is stored in the memory 110b.

Moreover, the control device 110 may control the first instrument, such as the vibration motor provided to the gripping part 102A, and give the operator the tactile sense, such as vibration, based on the first information so that he/she can follow the locus of the manipulator 102 by the manipulation of the expert which is stored in the memory 110b. Therefore, the expert's work can be taught to the operator who is inexperienced in the work.

Moreover, the control device 110 may control the first instrument, such as the vibration motor provided to the gripping part 102A to give the operator a tactile sense which becomes a warning such as vibration, when there is a possibility of the robot 101 moving outside the operating range set in advance, the robot 101 approaching outside the operating range, or even if the robot 101 is in the operating range, the robot 101 moving into the area where moving is prohibited.

Here, the "tactile sense which becomes a warning" may be a tactile sense with an acceleration etc. of the vibration larger than a given value set in advance. For example, it may be giving the operator the vibration of 55 dB or higher, or may be giving the operator the vibration of 65 dB or higher. Alternatively, the "tactile sense which becomes a warning" may be giving a tactile sense (vibration) larger than the tactile sense, such as the vibration given to the operator, based on the first information stored in the memory 110b.

Modification 1

Next, a modification of the robot system according to Embodiment 1 is described.

A robot system of Modification 1 of Embodiment 1 is configured so that the robot cuts or polishes the workpiece.

Below, one example of the robot system of Modification 1 of Embodiment 1 is described with reference to FIG. 2.

Figure 2:
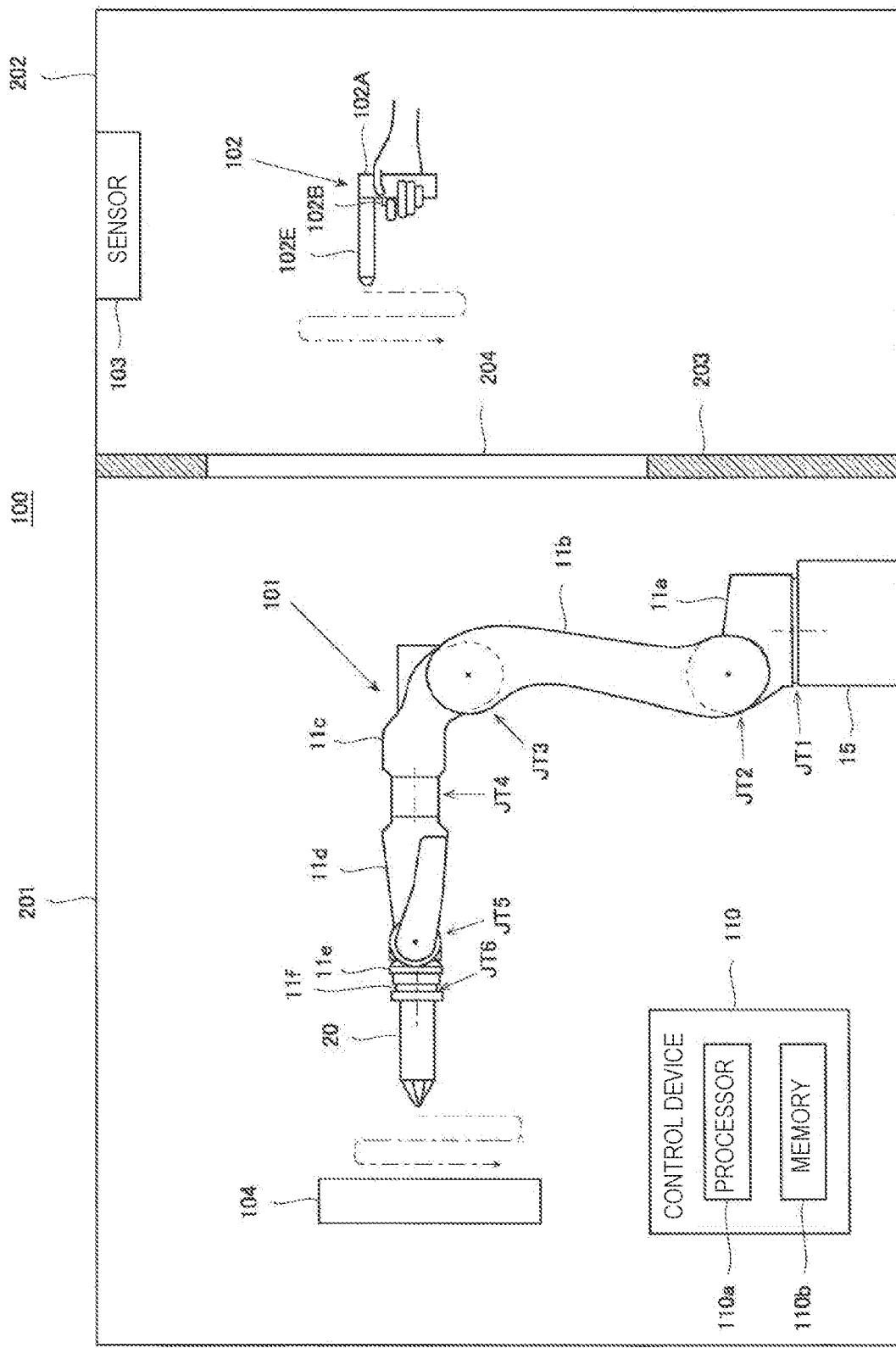
FIG. 2 is a schematic view illustrating an outline configuration of a robot system of Modification 1 of Embodiment 1.

FIG. 2 is a schematic view illustrating an outline configuration of the robot system of Modification 1 of Embodiment 1.

As illustrated in FIG. 2, the robot system 100 of Modification 1 is the same in the fundamental configuration as the robot system 100 according to Embodiment 1, but it differs in that the end effector 20 of the robot 101 cuts or polishes the workpiece 104. In detail, for example, the end effector 20 may have a cutting tool, such as a drill, an end mill, or a reamer to cut the workpiece 104. Alternatively, for example, the end effector 20 may have an abrasive, such as a grindstone to grind the workpiece 104.

The robot system 100 of Modification 1 configured in this way also has similar operation and effects to the robot system 100 according to Embodiment 1.

Modification 2

In the robot system of Modification 1 of Embodiment 1, a detector which wirelessly detects the positional information and the posture information on the manipulator is provided to the manipulator, and a transmitter which transmits to the control device the positional information and the posture information on the manipulator detected by the detector is disposed at the manipulation area.

Below, one example of a robot system of Modification 2 of Embodiment 1 is described with reference to FIG. 3.

Figure 3:
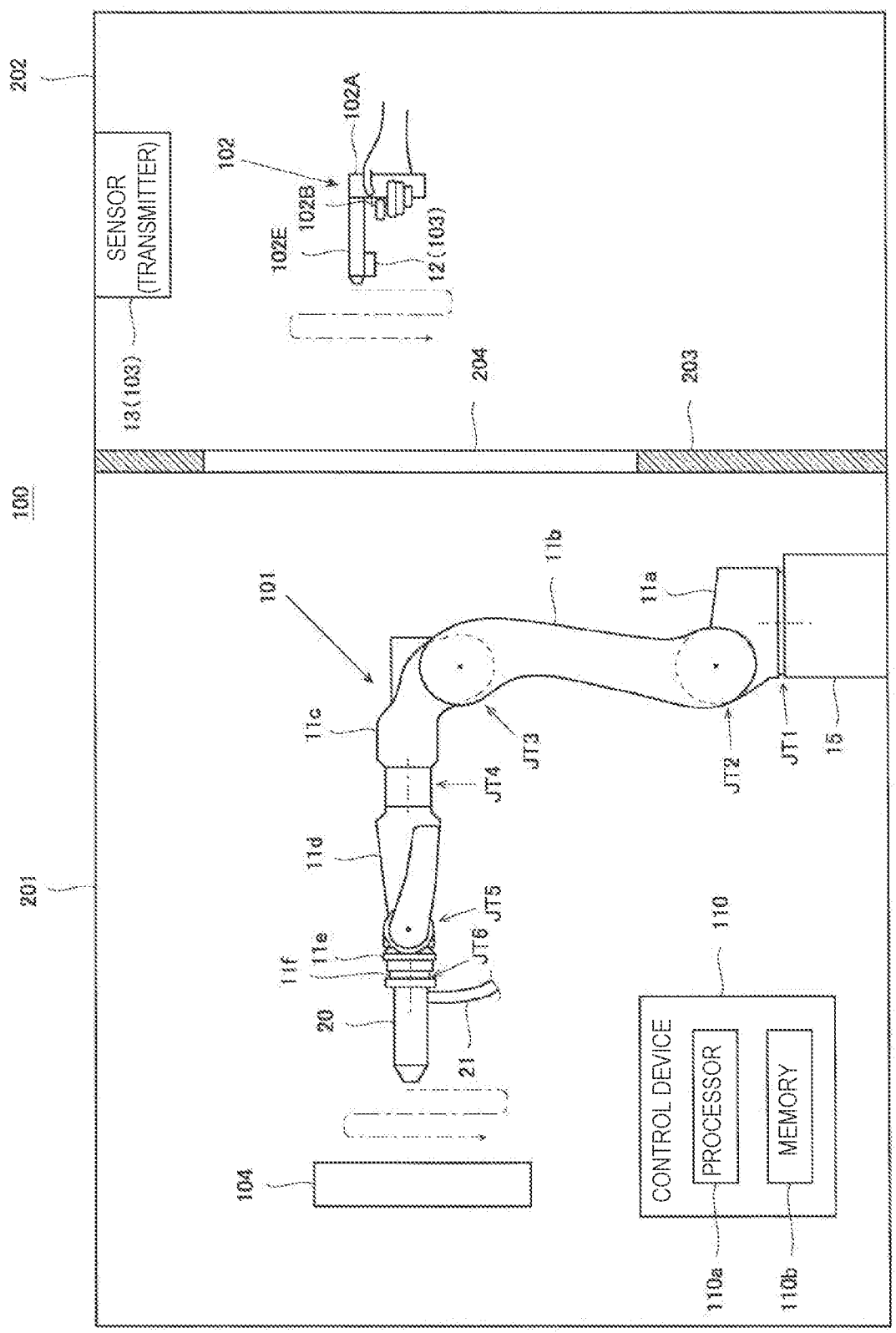
FIG. 3 is a schematic view illustrating an outline configuration of a robot system of Modification 2 of Embodiment 1.

FIG. 3 is a schematic view illustrating an outline configuration of the robot system of Modification 2 of Embodiment 1.

As illustrated in FIG. 3, the robot system 100 of Modification 2 is the same in the fundamental configuration as the robot system 100 according to Embodiment 1, but differs in that a detector 12 which wirelessly detects the positional information and/or the posture information on the manipulator 102 is provided to the manipulator 102, and a transmitter 13 which transmits to the control device 110 the positional information and/or the posture information on the manipulator 102 detected by the detector 12 is provided. The detector 12 may be a gyro sensor or a camera, for example.

Note that, in Modification 2, the detector 12 and the transmitter 13 constitute the sensor 103.

The robot system 100 of Modification 2 configured in this way also has similar operation and effects to the robot system 100 according to Embodiment 1.

Embodiment 2

In a robot system according to Embodiment 2, the work area in the robot system according to Embodiment 1 (including the modifications) is classified into a plurality of work sections, and the manipulation area is classified into a plurality of manipulation sections, and the robot is disposed for every work section, and the sensor is disposed for every manipulation section, and the control device operates the robot disposed at an N-th work section based on the positional information and the posture information on the manipulator detected by the sensor disposed at an N-th manipulation section. Note that, "N" is a natural number.

Moreover, in the robot system according to Embodiment 2, the manipulator may further have a selector which switches ON/OFF of the output of the positional information and the posture information on the manipulator detected by the sensor.

Below, one example of the robot system according to Embodiment 2 is described with reference to FIG. 4.

Configuration of Robot System

Figure 4:
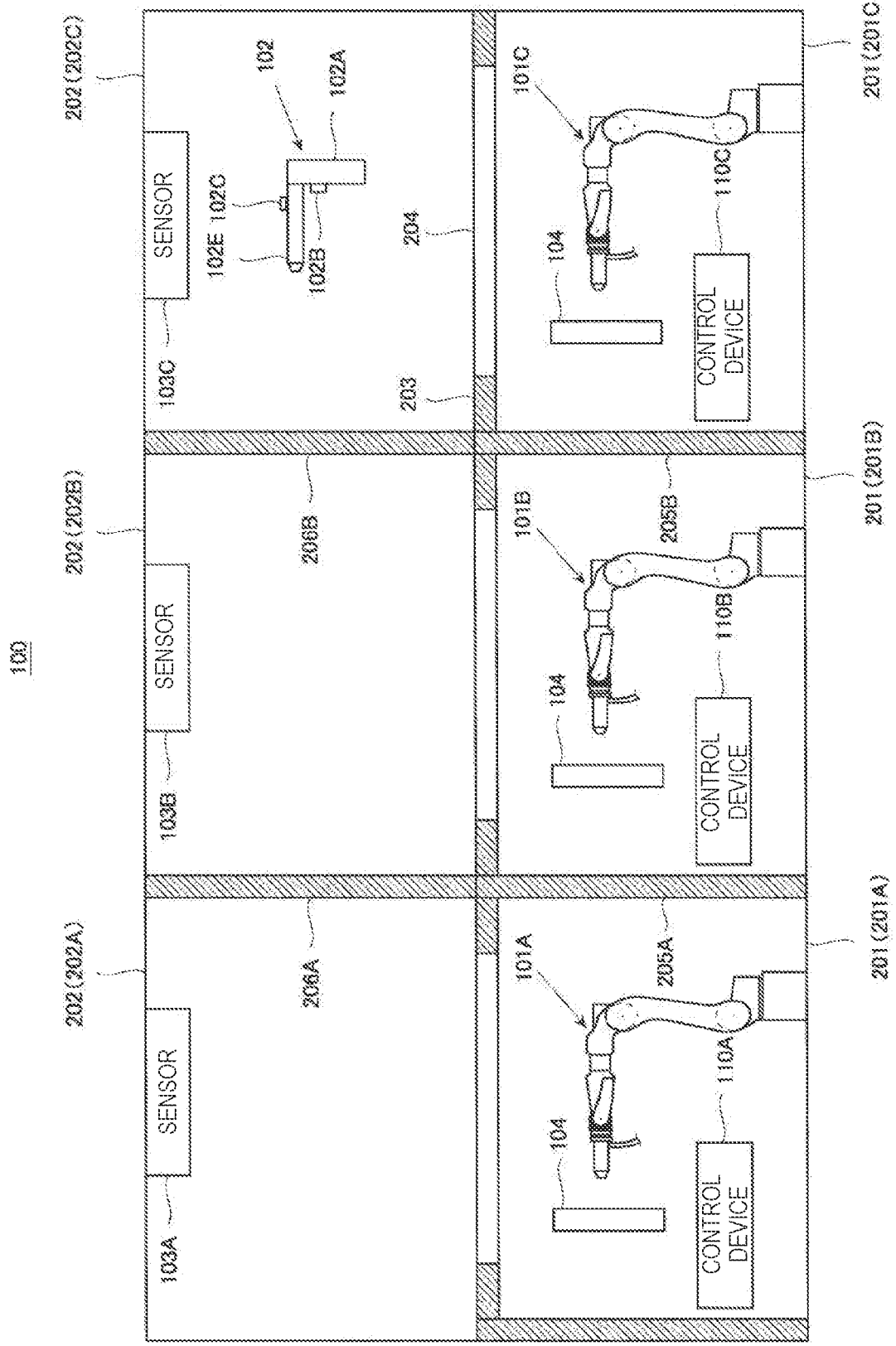
FIG. 4 is a schematic view illustrating an outline configuration of a robot system according to Embodiment 2.

FIG. 4 is a schematic view illustrating an outline configuration of the robot system according to Embodiment 2.

As illustrated in FIG. 4, the robot system 100 according to Embodiment 2 is the same in the fundamental configuration as the robot system 100 according to Embodiment 1, but it differs in that the work area 201 is classified into a plurality of (here, three) work sections 201A-201C by a plurality of (here, two) wall members 205A and 205B, the manipulation area 202 is classified into a plurality of (here, three) manipulation sections 202A-202C by a plurality of (here, two) wall members 206A and 206B, the robot 101 is disposed for every work section, and the sensor 103 is disposed for every manipulation section.

Note that, if the robot 101 disposed at each work section needs to be distinguished, the robot disposed at the work section 201A is referred to as the robot 101A, the robot disposed at the work section 201B is referred to as the robot 101B, and the robot disposed at the work section 201C is referred to as the robot 101C. Similarly, if the sensor 103 disposed at each manipulation section needs to be distinguished, the sensor disposed at the manipulation section 202A is referred to as the sensor 103A, the sensor disposed at the manipulation section 202B is referred to as the sensor 103B, and the sensor disposed at the manipulation section 202C is referred to as the sensor 103C.

Moreover, in the robot system 100 according to Embodiment 2, the manipulator 102 further has a selector 102C which switches ON/OFF of the output of the positional information and the posture information on the manipulator 102 detected by the sensor 103.

For example, when the operator moves from the manipulation section 202A to the manipulation section 202C, he/she may operate the selector 102C inside the manipulation section 202A to turn OFF the output of the positional information and the posture information, and after moved to the manipulation section 202C, he/she may operate the selector 102C to turn ON the output of the sensor 103C.

Moreover, in the robot system 100 according to Embodiment 2, the control device 110 is disposed for every work section. Note that, if the control device 110 disposed at each work section needs to be distinguished, the control device disposed at the work section 201A is referred to as the control device 110A, the control device disposed at the work section 201B is referred to as the control device 110B, and the control device disposed at the work section 201C is referred to as the control device 110C.

Moreover, in Embodiment 2, the control devices 110A-110C disposed at the work sections 201A-201C control the robots 101A-101C disposed at the work sections 201A-201C, respectively, but it is not limited to this configuration. A sole control device 110 may control the robots 101A-101C disposed at the respective work sections 201A-201C.

Moreover, in Embodiment 2, the control device 110A operates the robot 101A disposed at the manipulation section 202A (first manipulation section) based on the positional information and the posture information outputted from the sensor 103A disposed at the work section 201A (first work section). Similarly, the control device 110B operates the robot 101B disposed at the manipulation section 202B (second manipulation section) based on the positional information and the posture information outputted from the sensor 103B disposed at the work section 201B (second work section). Moreover, the control device 110C operates the robot 101C disposed at the manipulation section 202C (third manipulation section) based on the positional information and the posture information outputted from the sensor 103C disposed at the work section 201C (third work section).

That is, in Embodiment 2, the control device 110 operates the robot 101 disposed at the N-th manipulation section based on the positional information and the posture information outputted from the sensor 103 disposed at the N-th work section.

The robot system 100 according to Embodiment 2 configured in this way also has similar operation and effects to the robot system 100 according to Embodiment 1.

Moreover, in the robot system 100 according to Embodiment 2, the control device 110 operates the robot 101 disposed at the N-th manipulation section based on the positional information and the posture information outputted from the sensor 103 disposed at the N-th work section.

Therefore, the operators are located at the respective manipulation sections, and the operators can simultaneously operate the respective robots 101 disposed at the corresponding work sections. Moreover, the operator can move between the manipulation sections to operate the robot 101 disposed at each work section by using a single manipulator 102.

Moreover, in the robot system 100 according to Embodiment 2, the manipulator 102 further has the selector 102C which switches ON/OFF of the output of the positional information and the posture information on the manipulator 102 detected by the sensor 103.

Therefore, the operator can move between the manipulation sections to operate the robot 101 disposed at each work section by using a single manipulator 102.

Embodiment 3

In a robot system according to Embodiment 3, the work area in the robot system according to Embodiment 1 (including the modifications) is classified into a plurality of work sections, the robot is disposed for every work section, the manipulator further has a designator which designates a robot to be operated among a plurality of robots, and the control device operates on real time the robot designated by the designator based on the positional information and the posture information on the manipulator detected by the sensor.

Below, one example of the robot system according to Embodiment 3 is described with reference to FIG. 5.

Configuration of Robot System

Figure 5:
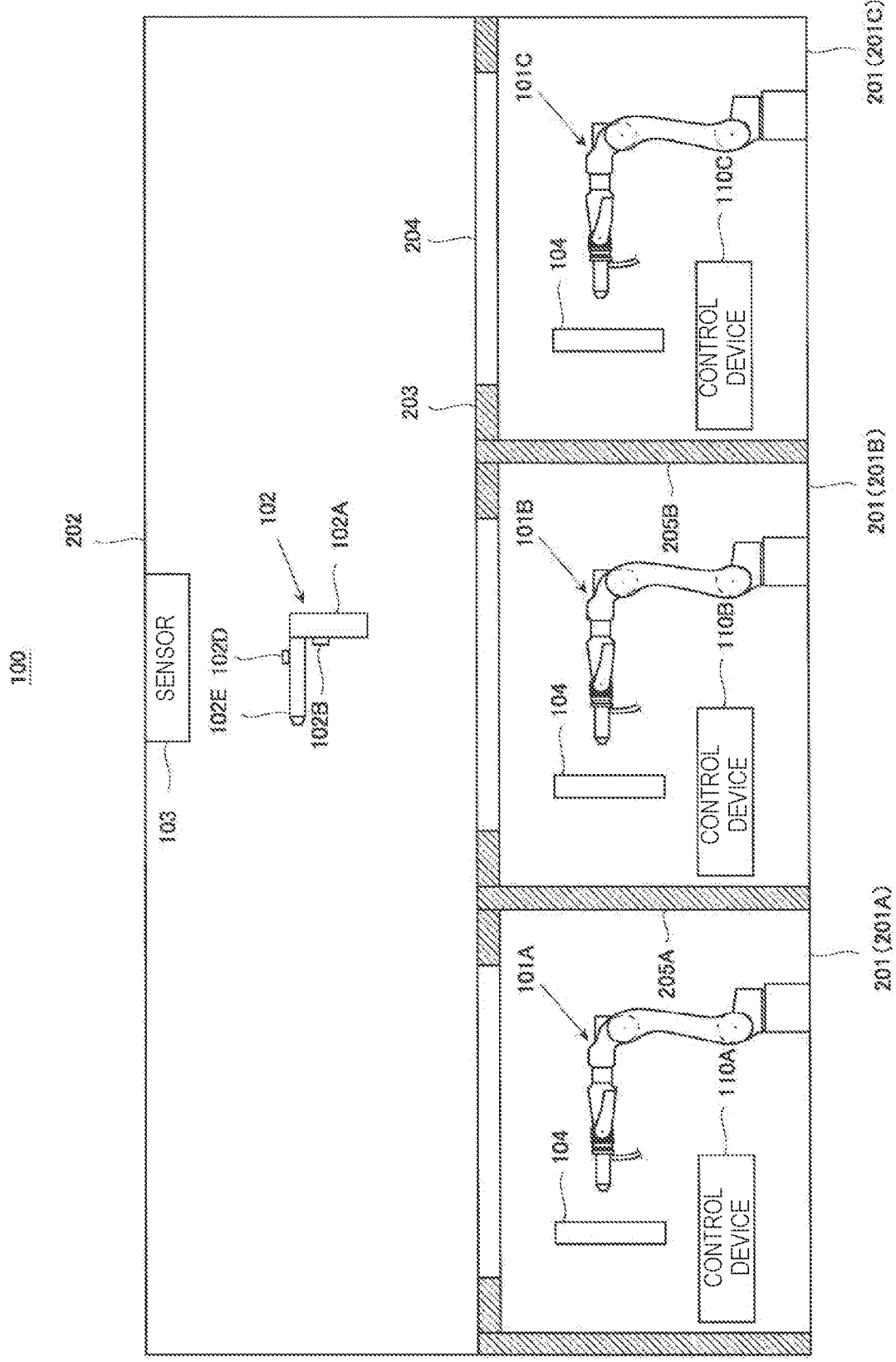
FIG. 5 is a schematic view illustrating an outline configuration of a robot system according to Embodiment 3.

FIG. 5 is a schematic view illustrating an outline configuration of the robot system according to Embodiment 3.

As illustrated in FIG. 5, the robot system 100 according to Embodiment 3 is the same in the fundamental configuration as the robot system 100 according to Embodiment 1, but it differs in that the work area 201 is classified into a plurality of (here, three) work sections 201A-201C by the plurality of (here, two) wall members 205A and 205B, and the robot 101 is disposed for every work section.

Note that, if the robot 101 disposed at each work section needs to be distinguished, the robot disposed at the work section 201A is referred to as the robot 101A, the robot disposed at the work section 201B is referred to as the robot 101B, and the robot disposed at the work section 201C is referred to as the robot 101C.

Moreover, in the robot system 100 according to Embodiment 3, the manipulator 102 further has a designator 102D which designates the robot 101 to be operated among the plurality of robots 101. The designator 102D may be comprised of ten keys, or may be comprised of a jog dial (rotary selector), or may be comprised of a cross key.

Note that an alarm may be provided to the robot 101 and/or each work section, and by operating the designator 102D, the operator may be informed about the robot 101 to be operated. The alarm may be a display device (screen) which displays character data or image data, a mode of informing by audio with a speaker etc., or a mode of informing by light or color. Alternatively, it may be informed by an email or an application to a smartphone, a cellular phone, or a tablet computer through a communication network.

Moreover, in the robot system 100 according to Embodiment 3, the control devices 110A-110C disposed at the work sections 201A-201C control the robots 101A-101C disposed at the work sections 201A-201C, respectively, but it is not limited to this configuration. A sole control device 110 may control the robots 101A-101C disposed at the respective work sections 201A-201C.

The robot system 100 according to Embodiment 3 configured in this way also has similar operation and effects to the robot system 100 according to Embodiment 1.

Moreover, in the robot system 100 according to Embodiment 3, it further has the designator 102D which designates the robot 101 to be operated among the plurality of robots 101. Therefore, the operator can operate the robot 101 disposed at each work section by a single manipulator 102.

Embodiment 4

In a robot system according to Embodiment 4, in the robot system according to one of Embodiments 1-3 (including the modifications), a camera which images an instrument disposed at the work area is disposed at the work area, and a display device which displays image information imaged by the camera is disposed at the manipulation area.

Below, one example of the robot system according to Embodiment 4 is described with reference to FIG. 6.

Configuration of Robot System

Figure 6:
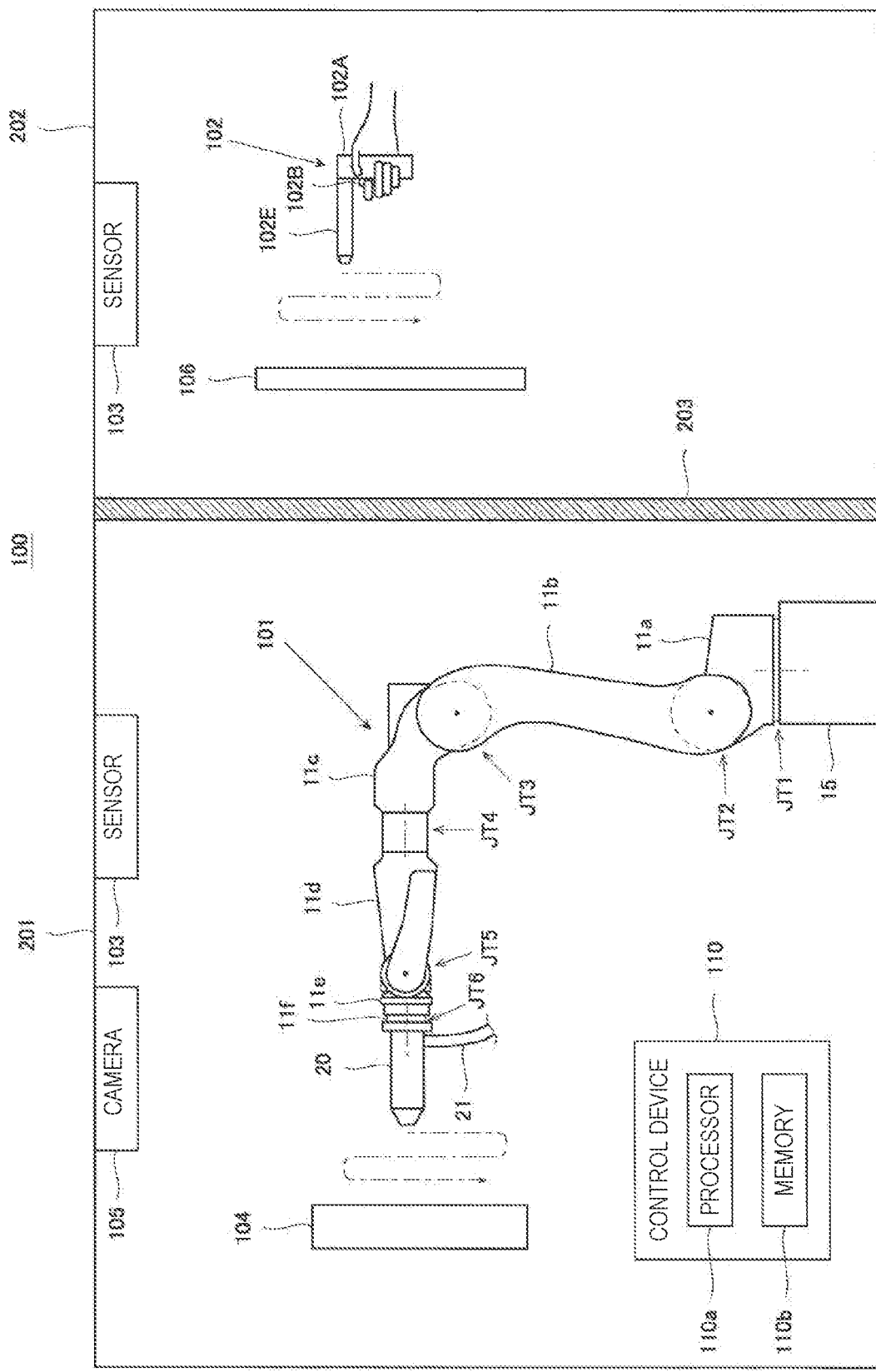
FIG. 6 is a schematic view illustrating an outline configuration of a robot system according to Embodiment 4.

FIG. 6 is a schematic view illustrating an outline configuration of the robot system according to Embodiment 4.

As illustrated in FIG. 6, the robot system 100 according to Embodiment 4 is the same in the fundamental configuration as the robot system 100 according to Embodiment 1, but it differs in that a camera 105 which images the instrument (for example, the robot 101, the workpiece 104, etc.) disposed at the work area is disposed at the work area 201, and a display device 106 which displays image information imaged by the camera 105 is disposed at the manipulation area 202.

For example, the camera 105 may be installed at a ceiling, a side wall surface (wall member 203), or a tip-end part of the robot 101. The display device 106 may be comprised of a non-portable display which is installed and used on a desk, a floor, etc. Moreover, the display device 106 may be comprised of a head mounted display or eye glasses which is worn and used by the operator.

Note that the control device 110 may display the image information on the display device 106. For example, the image information may be a virtual workpiece or a virtual robot, may be a process of operation, or may be information on the material or the size of the workpiece 104. The robot system 100 according to Embodiment 4 configured in this way also has similar operation and effects to the robot system 100 according to Embodiment 1.

Moreover, in the robot system 100 according to Embodiment 4, the camera 105 which images the instrument disposed at the work area is disposed at the work area 201, and the display device 106 which displays the image information imaged by the camera 105 is disposed at the manipulation area 202.

Therefore, the operator can remotely operate the robot 101 even if the work area 201 is separated from the manipulation area 202.

Note that, in Embodiment 4, the control device 110 may calculate the locus of the manipulator 102 which is caused by the operator moving (operating) the manipulator 102, and may store in the memory 110b the work (locus information on the manipulator 102) performed by the robot 101 based on the calculated locus. Moreover, the control device 110 may operate the robot 101 according to the locus information on the manipulator 102 stored in the memory 110b.

Moreover, the control device 110 may operate the virtual robot displayed on the display device 106, according to the locus information on the manipulator 102 stored in the memory 110b. In this case, the control device 110 may operate, by the operator using the manipulator 102, the virtual robot displayed on the display device 106 according to the locus information on the manipulator 102 stored in the memory 110b, simultaneously with the start of the operation (work) of the robot 101.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

INDUSTRIAL APPLICABILITY

According to the robot system of the present disclosure, since the operator's burden can be eased and the work efficiency can be improved, it is useful in the field of robots.

The invention claimed is:

1. A robot system, comprising:
a robot installed in a work area and configured to inject liquid or gas to a workpiece and/or cut or polish the workpiece;
a manipulator comprising a tip end;
a sensor disposed at a manipulation area and configured to wirelessly detect positional information and posture information on the tip end of the manipulator; and
a control device,
wherein the control device calculates a locus of the tip end of the manipulator based on the positional information and the posture information on the tip end part of the manipulator detected by the sensor, and operates the robot on real time such that the robot follows the locus of the tip end part.

2. The robot system of claim 1, wherein the control device calculates the locus of the tip end of the manipulator based on the positional information and the posture information on the tip end of the manipulator detected by the sensor, and based on the calculated locus, causes the robot to perform one of works on real time, including an injecting work in which the liquid or the gas is injected to the workpiece, a cutting work in which the workpiece is cut, and a polishing work in which the workpiece is polished.

3. The robot system of claim 1,
wherein the work area is classified into a plurality of work sections,
wherein the manipulation area is classified into a plurality of manipulation sections,
wherein the robot is one of a plurality of robots disposed at every work section,
wherein the sensor is disposed so as to wirelessly detect positional information and posture information on the tip end of the manipulator in every manipulation section, and
wherein the control device operates the robot disposed at an N-th work section of the plurality of work sections based on the positional information and the posture information on the tip end of the manipulator disposed at an N-th manipulation section of the plurality of manipulation sections detected by the sensor.

4. The robot system of claim 3, wherein the manipulator further includes a selector switch, configured to switch ON/OFF an output of the positional information and the posture information on the tip end of the manipulator detected by the sensor.

5. The robot system of claim 1,
wherein the work area is classified into a plurality of work sections,
wherein the robot is one of a plurality of robots disposed at every work section,
wherein the manipulator further includes a designator comprising an input device, and
wherein in response to designating the robot, among the plurality of robots, to be operated, based on input by the input device of the designator, the control device operates on real time the robot designated by the designator, based on the positional information and the posture information on the tip end of the manipulator detected by the sensor.

6. The robot system of claim 1, wherein a camera configured to image an instrument disposed at the work area, is disposed at the work area, and
wherein a display device configured to display image information imaged by the camera is disposed at the manipulation area.

7. The robot system of claim 2, wherein a gripping part of the manipulator is provided with a first instrument configured to give a tactile sense to an operator,
wherein the control device includes a memory,
wherein the memory stores first information that is locus information on the tip end of the manipulator by manipulation of an expert of one of the works including the injecting work in which liquid or gas is injected to the workpiece, the cutting work in which the workpiece is cut, and the polishing work in which the workpiece is polished, and
wherein the control device operates the first instrument so that the operator is guided based on the first information stored in the memory.

8. The robot system of claim 7, wherein the control device controls the first instrument to give to the operator a tactile sense that becomes a warning, when there is a possibility of the robot moving outside an operating range set in advance, the robot approaching outside the operating range, or, even when the robot is located inside the operating range, the robot moving into an area where moving is prohibited.

* * * * *